United States Patent [19]
Wilcox, II

[11] Patent Number: 5,398,406
[45] Date of Patent: Mar. 21, 1995

[54] BALANCE SHAFT ELIMINATOR KIT

[76] Inventor: David T. Wilcox, II, 1723-31 Summit Ave., Richmond, Va. 23230

[21] Appl. No.: 128,781

[22] Filed: Sep. 30, 1993

[51] Int. Cl.⁶ .............................................. B23P 15/00
[52] U.S. Cl. ................................ 29/888.011; 123/1 R; 29/401.1
[58] Field of Search ...................... 29/888.011, 888.01, 29/401.1; 123/DIG. 1, DIG. 7, 1 R, 198 R, 192.2

[56] References Cited

U.S. PATENT DOCUMENTS 4,594,757  6/1986  Johnson, Jr. ..................... 29/33 K Primary Examiner—Irene Cuda
Attorney, Agent, or Firm—Norman B. Rainer

[57] ABSTRACT

A retrofit kit for enabling an inline four cylinder automobile internal combustion engine to operate following removal of its upper and lower balance shafts. The includes a first bushing having a smooth circular cylindrical outer surface sized to permit close-fitting insertion into an oil-receiving bore that houses an upper balance shaft, and thereby interrupting the flow of oil to said bore, a second bushing having a smooth circular cylindrical outer surface sized to permit close-fitting interaction with an oil pump in a manner to interrupt oil flow to an oil-receiving bore that houses a lower balance shaft, and a replacement endless roller chain sized to extend interactively between the oil pump and the crankshaft of the engine.

4 Claims, 3 Drawing Sheets

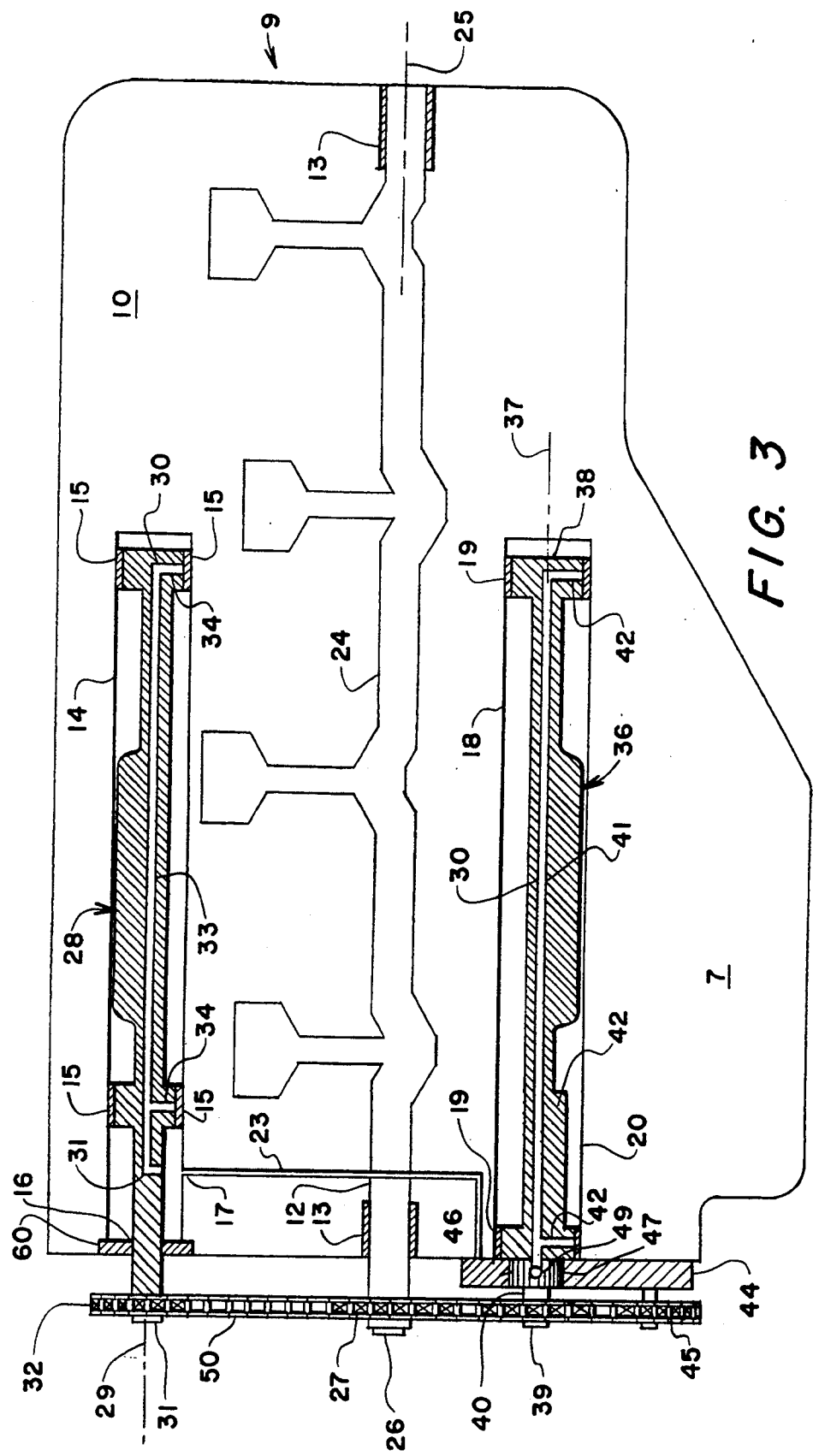

BALANCE SHAFT ELIMINATOR KIT

BACKGROUND OF THE INVENTION

1. Field of the Invention

This invention relates to internal combustion engines, and more particularly concerns a kit having parts which allows the operation of an engine with its two balance shafts removed.

2. Description of the Prior Art

Numerous inline four cylinder engines have been disclosed in the prior art. A well known inherent shortcoming of this engine cylinder configuration has been the vibration caused by the unbalanced nature of cylinder firing. Various mechanisms have been employed in attempts to eliminate the jerky vibration of inline four cylinder engines. The most effective designs employ one or more counter-weighted balance shafts which are disposed within the engine block parallel to the crankshaft. Balance shafts are generally adapted to rotate at twice crankshaft speed, and harmonically cancel the inertial forces of the crankshaft and cylinders. For example, U.S. Pat. No. 4,594,757 discloses an engine which utilizes balance shafts.

Another engine having balance shafts is the Chrysler/Mitsubishi 2.6 liter engine. Upper and lower balance shafts which rotate at twice the speed of the crankshaft are timed to coincide with the firing of the cylinders, and harmonically cancel vibration. The upper shaft is driven directly from a balance shaft drive chain which is driven by a sprocket at the front of the crankshaft. The lower balance shaft is driven by the oil pump which is driven by said balance shaft drive chain. Although the balance shafts essentially perform their intended purpose, long term maintenance experience with this popular engine has revealed significant shortcomings. Most specifically, the engine's lubrication system does a poor job of oiling the bearings which support these balance shafts. Oil enters the upper balance shaft through an oil galley associated with one bearing bore only, which is located at the front of the engine. Oil enters the lower balance shaft through a passage in the oil pump drive gear. Oil travels though each shaft in order to reach the rear bearings supporting each shaft. Being that the balance shafts turn at twice the speed of the engine's crankshaft, the balance shafts require greater volumes of oil, which are just never delivered by an inadequate lubrication system.

The balance shaft drive chain is subject to wear, which may ultimately result in failure of the balance shaft drive altogether, including the oil pump. This of course is catastrophic to the engine. In many instances the lack of oil results in premature failure of the balance shaft bearings. Once the bearings in the balance shaft bores have seized to the shafts and spun in the bearing bores, the engine block is rendered unusable and may not be rebuilt. If the balance shaft bearings are not spun, a rebuilding of the engine requires replacement of balance shafts, bearings, sprockets, drive chain, tensioners and chain guides at considerable cost.

Many manufacturers and drivers of four cylinder vehicles have come to accept the vibration of an unbalanced engine as normal. Since the potential for catastrophic engine failure may far outweigh the benefits of reduced vibration, it is desirable to have a means for pre-emptively modifying the Chrysler/Mitsubishi 2.6 liter engine by eliminating the balance shafts and permitting otherwise normal operation of the engine. It is also desirable to have means for re-building a Chrysler/Mitsubishi 2.6 liter engine once the bearing journals have been irreparably damaged.

It is accordingly an object of the present invention to provide a retrofit kit for a Chrysler/Mitsubishi 2.6 liter engine which will permit the operation of the engine with its balance shafts removed.

It is another object of the present invention to provide a retrofit kit of the aforesaid type which will prevent the occurrence of catastrophic engine failure due to malfunction of the engines lubrication system.

It is yet another object of the present invention to provide a retrofit kit of the aforesaid nature to permit the usage of an engine block which has been rendered otherwise useless due to premature balance shaft bearing seizure and to otherwise economically rebuild an engine requiring balance shaft and drive component replacement.

It is another object of the present invention to provide a retrofit kit of the aforesaid nature which will increase the engine's horsepower and operating oil pressure.

It is still another object of the present invention to provide a retrofit kit of the aforesaid nature which is simple to install, durable in construction, resistant to failure, and amenable to low cost manufacture.

These and other beneficial objects and advantages will be apparent from the following description.

SUMMARY OF THE INVENTION

The above and other beneficial objects and advantages are accomplished in accordance with the present invention by a retrofit kit for an inline four cylinder engine having:

1) an engine block elongated about a longitudinal axis, and having
   a) a plurality of longitudinally aligned main bearing bores lined with main bearings,
   b) at least one upper balance shaft bore longitudinally aligned in parallel relationship to said main bearing bores and lined with upper balance shaft bearings, said bore having an oiling aperture,
   c) at least one lower balance shaft bore longitudinally aligned in parallel relationship to said main bearing bores and lined with lower balance shaft bearings,
   d) oil pump mounting means associated with the most forward of said lower balance shaft bores, and
   e) an oil galley communicating between said oil pump mounting means and said oiling aperture,
2) a crankshaft journaled to said main bearings and having a longitudinal axis of rotation and a forward extremity associated with a crankshaft sprocket,
3) an upper counterweighted balance shaft having a longitudinal axis of rotation and journaled to said upper balance shaft, bore, said upper balance shaft elongated between a rear extremity and a forward extremity rotatably associated with a thrust plate which is removably affixed to said block and fixedly associated with an upper balance shaft sprocket wheel, said upper balance shaft having a longitudinally central elongated oil passage and a plurality of transverse oil passages each having a shaft aperture communicating between said central oil passage and one of said upper balance shaft bearings, 4) a lower counterweighted balance shaft having a longitudinal axis of rotation and journaled to said lower balance shaft bore, said lower balance shaft elongated between a rear extremity and a forward extremity having an oil pump mounting journal, said lower balance shaft having a longitudinally central elongated oil passage and a plurality of transverse oil passages each having a shaft aperture communicating between said central oil passage and one of said lower balance shaft bearings, 5) an oil pump having an oil pump sprocket wheel and a drive gear having a bore removably affixed to said oil pump mounting journal and adapted to transmit rotational force to said lower balance shaft, said drive gear bore having a drive gear oil passage adapted to communicate with said lower balance shaft central oil passage, and 6) an endless balance shaft drive chain adapted to travel in a circuitous planar path about said crankshaft sprocket, upper balance shaft sprocket, and oil pump sprocket, each of said sprockets having teeth of common pitch and size and juxtaposed in a common plane, whereby:

1) oil entering said upper balance shaft via said oiling aperture is routed inwardly through the transverse oil passage associated with the most forward of said upper balance shaft bores, through said central oil passage and outwardly through said transverse oil passages thereby oiling the remaining upper balance shaft bearings, and 2) oil entering said lower balance shaft via said oiling pump drive gear bore oil passage is routed inwardly through said central oil passage and outwardly through said transverse oil passages, thereby oiling said lower balance shaft bearings, said retrofit kit adapted to be installed in said engine subsequent to the removal of said upper and lower balance shafts, balance shaft drive chain, and oil pump, said kit comprised of:

a) an upper balance shaft bore bushing having a smooth circular cylindrical outer surface and adapted to be driven into the most forward of said upper balance shaft bores in close conformity, thereby blocking the flow of oil through said oiling aperture, b) an oil pump drive bore bushing having a smooth circular cylindrical outer surface adapted to be driven into said oil pump drive bore in close conformity, thereby blocking the flow of oil through said drive gear oil passage, said oil pump drive bore bushing adapted to be installed prior to re-installation of said oil pump, and c) an endless replacement chain adapted to travel in a circuitous path between said oil pump sprocket and said crankshaft, thereby providing rotational driving force to said oil pump.

In a preferred embodiment, said bushings may be constructed from steel. Alternatively, bronze, aluminum, or plastic may be used. The replacement chain is constructed from steel and has the same pitch and width of the balance shaft drive chain it replaces.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 3 is a sectional side view of an engine prior to installation of the kit of the present invention.

DESCRIPTION OF THE PREFERRED EMBODIMENT

Figure 1:
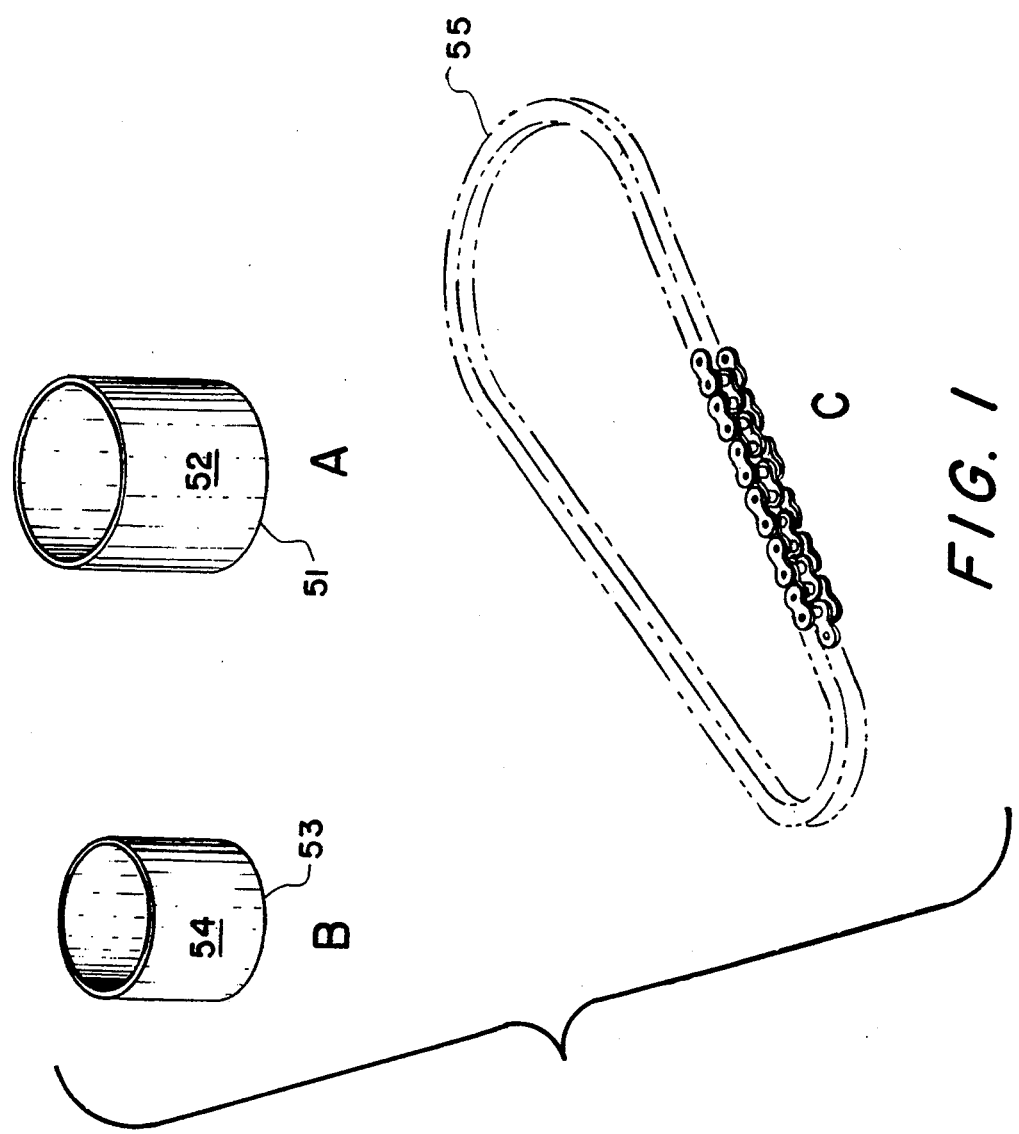
FIG. 1 is a perspective view of an embodiment of the kit of the present invention, the individual components being identified by the reference letters A, B, and C.
Figure 2:
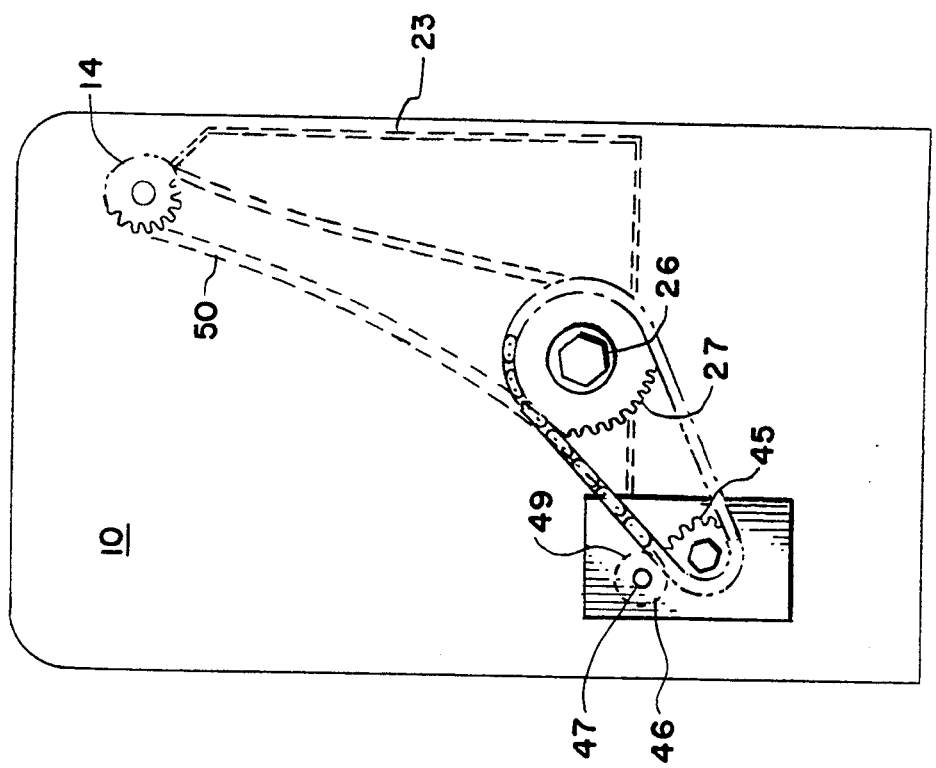
FIG. 2 is a front view of the kit of FIG. 1 installed upon an engine block and oil pump.

Referring to FIGS. 1-3, an embodiment of the kit of the present invention is shown in operative association with a Chrysler/Mitsubishi 2.6 liter engine 9 having engine block 10, oil pan 7, longitudinally aligned main bearing bore 12 lined with main bearings 13, upper balance shaft bore 14 longitudinally aligned in parallel relationship to main bearing bore 12 and lined with upper balance shaft bearings 15. Forward extremity 16 of bore 14 is provided with oiling port 17.

A lower balance shaft bore 18, longitudinally aligned in parallel relationship to main bearing bore 12, is lined with lower balance shaft bearings 19, and forwardly terminates in extremity 20.

Oil pump 44, mounted to the front surface 62 of block 10, has a threaded channel 22 communicating with forward extremity 20 of said lower balance shaft bore. Oil tube 23 communicates between oil pump 44 and oiling port 17. Crankshaft 24 is journaled to main bearings 13 and has a longitudinal axis of rotation 25, and forward extremity 26 associated with crankshaft sprocket 27.

Upper balance shaft 28, rotationally centered on longitudinal axis 29, is journaled to upper balance shaft bearings 15. Upper balance shaft 28 is elongated between rear extremity 30 and forward extremity 31 rotatably associated with thrust plate 60 which is removably affixed to block 10 and fixedly associated with upper balance shaft sprocket wheel 32. Thrust plate 60 functions to limit movement of upper balance shaft 28 to rotation about axis 29. Upper balance shaft 28 has longitudinally central elongated oil passage 33 and transverse oil passages 34, each communicating between central oil passage 33 and shaft bearings 15.

Lower balance shaft 36, rotationally centered on longitudinal axis 37, is journaled to lower balance shaft bearings 19. The lower balance shaft is elongated between rear extremity 38 and forward extremity 39, and has oil pump mounting journal 40. Lower balance shaft 36 has longitudinally central elongated oil passage 41, and transverse oil passages 42 communicating between central oil passage 41 and shaft bearings 19.

Oil pump 44 has oil pump sprocket wheel 45 and drive gear 46 having bore 47 removably affixed to oil pump mounting journal 40, and is adapted to transmit rotational force to lower balance shaft 36. Drive gear bore 47 has drive gear oil passage 49 adapted to communicate with lower balance shaft central oil passage 41. In the unmodified engine shown in FIG. 3, endless drive chain 50 travels in a circuitous planar path about crankshaft sprocket 27, upper balance shaft sprocket 32, and oil pump sprocket 45, each of said sprockets having teeth of common pitch and size and juxtaposed in a common plane.

Normal lubrication of the engine 9 occurs as follows. Oil entering upper balance shaft 28 via oiling port 17 is routed through oil passage 33 and outwardly through transverse oil passages 34, thereby oiling upper balance shaft bearings 15.

Oil entering lower balance shaft 36 via oiling pump drive gear bore oil passage 49 is routed through central oil passage 41 and outwardly through transverse oil passages 42, thereby oiling lower balance shaft bearings 19.

The retrofit kit of the present invention is adapted to be installed in engine 9 subsequent to the removal of upper and lower balance shafts 28 and 36, respectively, drive chain 50, and oil pump 44.

The kit is comprised of upper balance shaft bore bushing 51, designated by reference letter A in FIG. 1, having smooth circular cylindrical outer surface 52. Bushing 51 is adapted to be driven into the front 16 of upper balance shaft bore 14 in close conformity, thereby blocking the flow of oil through oiling port 17.

Oil pump drive bore bushing 53, designated by reference letter B in FIG. 1, is constructed from steel and has a smooth circular cylindrical outer surface 54. Bushing 53 is adapted to be driven into oil pump drive bore 47 in close conformity, thereby blocking the flow of oil through drive gear oil passage 49. Oil pump drive bore bushing 53 is installed prior to re-installation of oil pump 44.

Endless replacement chain 55, designated by reference letter C in FIG. 1, is adapted to travel in a circuitous path between said oil pump sprocket 45 and said crankshaft sprocket 27, thereby providing rotational driving force to oil pump 44.

Once engine 9 is re-assembled without balance shafts 28 and 36, and drive chain 50, engine power is increased because the balance shafts are no longer being driven. Furthermore, engine life is prolonged due to the increased oil flow which previously served to lubricate the balance shafts, and now is pumped throughout the engine. Increased engine vibration is negligible and found to be quite acceptable.

While particular examples of the present invention have been shown and described, it is apparent that changes and modifications may be made therein without departing from the invention in its broadest aspects. The aim of the appended claims, therefore, is to cover all such changes and modification: as fall within the true spirit and scope of the invention.

Having thus described my invention, what is claimed is:

1. A retrofit kit for enabling an inline four cylinder automotive internal combustion engine to operate following removal of its upper and lower balance shafts, said engine further comprising an engine block having a front surface, a crankshaft; penetrating said front surface, and an oil pump mounted upon said front; surface, said balance shafts being rotatively positioned within oil-receiving bores that forwardly terminate in said front surface, said kit comprising:
    a) a first bushing having a smooth circular cylindrical outer surface sized to permit close-fitting insertion into the forward extremity of the bore for said upper balance shaft, thereby interrupting oil flow to said bore,
    b) a second bushing having a smooth circular cylindrical outer surface sized to permit close-fitting interaction with said oil pump in a manner to interrupt oil flow to the bore for said lower balance shaft, and
    c) a replacement endless roller chain sized to extend between said oil pump and crankshaft, thereby conveying rotational driving force from said crankshaft to said oil pump.

2. The kit of claim 1 wherein sprocket wheels are attached to said crankshaft and said oil pump, and said roller chain is interactive between said sprocket wheels.

3. The kit of claim 2 wherein the sprocket wheel of said oil pump is interactive with an impeller that forces oil toward the bore of said lower balance shaft.

4. The kit of claim 3 wherein said engine is a Chrysler/Mitsubishi 2.6 liter engine.

* * * * *